United States Patent
Pickett

(10) Patent No.: US 10,406,778 B2
(45) Date of Patent: Sep. 10, 2019

(54) SWISS CHEESE ATTACHMENT

(71) Applicant: GM Global Technology Operations LLC, Detroit, MI (US)

(72) Inventor: Thomas J. Pickett, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/159,932

(22) Filed: Oct. 15, 2018

(65) Prior Publication Data

US 2019/0039348 A1 Feb. 7, 2019

Related U.S. Application Data

(62) Division of application No. 14/303,168, filed on Jun. 12, 2014, now Pat. No. 10,124,560.

(51) Int. Cl.
| | | |
|---|---|---|
| *B32B 7/08* | (2019.01) | |
| *B32B 3/26* | (2006.01) | |
| *B32B 27/08* | (2006.01) | |
| *B29C 45/16* | (2006.01) | |
| *B32B 27/30* | (2006.01) | |
| *B32B 27/32* | (2006.01) | |
| *B32B 27/36* | (2006.01) | |
| *B32B 27/40* | (2006.01) | |
| *B29L 9/00* | (2006.01) | |

(52) U.S. Cl.
CPC ............ *B32B 7/08* (2013.01); *B29C 45/1657* (2013.01); *B29C 45/1676* (2013.01); *B32B 3/266* (2013.01); *B32B 27/08* (2013.01); *B32B 27/30* (2013.01); *B32B 27/32* (2013.01); *B32B 27/36* (2013.01); *B32B 27/365* (2013.01); *B32B 27/40* (2013.01); *B29L 2009/00* (2013.01); *B32B 2250/02* (2013.01); *B32B 2605/08* (2013.01); *B32B 2605/12* (2013.01); *B32B 2605/18* (2013.01); *Y10T 428/24339* (2015.01)

(58) Field of Classification Search
CPC ....................................................... B32B 7/08
See application file for complete search history.

(56) References Cited

U.S. PATENT DOCUMENTS

2011/0015743 A1\* 1/2011 Deslauriers ........... A61F 2/4455
623/17.16

\* cited by examiner

Primary Examiner — Larry W Thrower

(57) ABSTRACT

A two-piece part may include a first portion defining at least one through hole and a second portion may be cast such that the second portion extends through the through hole thereby mechanically interlocking the first portion and the second portion together.

12 Claims, 1 Drawing Sheet

SWISS CHEESE ATTACHMENT

This application is a divisional of U.S. application Ser. No. 14/303,168 filed Jun. 12, 2014.

TECHNICAL FIELD

The field to which the disclosure generally relates includes two-part polymer products being mechanically bonded together and methods of producing the same.

BACKGROUND

Multi-shot injection molding or over-molding is typically restricted to the use of two or more polymer materials known to chemically bond together. Such methods often require very narrow process parameters. Tearing or separation of the two or more materials at an interface may occur if process parameters are not followed carefully.

SUMMARY OF ILLUSTRATIVE VARIATIONS OF THE INVENTION

According to one variation, a method may provide a first part that may include a first material that may define a plurality of through holes. The first part may be formed or placed in a mold, and a second material may be caused to flow over the first part and through the through holes of the first part. When cooled, the second material may form a second part that may be mechanically bonded to the first part via portions of the second part that may extend through or around the first part.

A second variation may include a first portion that may include a first material composition and a second portion that may include a second composition. The first portion may define a plurality of through holes and the second portion may extend through said through holes. The extension of the second portion through the through holes of the first portion and the through holes themselves may be constructed and arranged to facilitate an interlocking mechanical bond between the first portion and the second portion.

Other illustrative variations of the invention will become apparent from the detailed description provided hereinafter. It should be understood that the detailed description and enumerated variations, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the variations is merely illustrative in nature and is in no way intended to limit the scope of the invention, its application or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Figure 1:
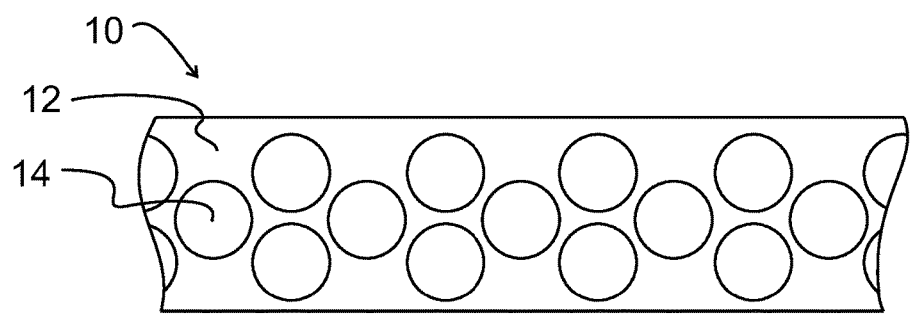
FIG. 1 illustrates a swiss cheese attachment according to one variation of the invention.

Referring to FIG. 1; a Swiss cheese attachment 10 may include a first portion 12. The first portion 12 may define at least one through whole 14.

Figure 2:
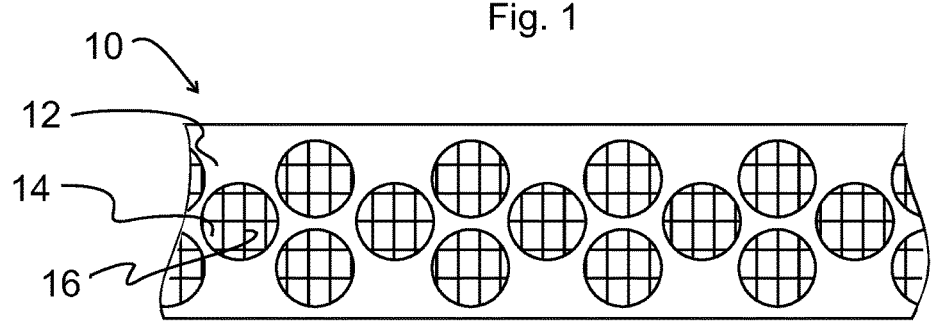
FIG. 2 illustrates a Swiss cheese attachment according to one variation of the invention.

Referring to FIG. 2; a Swiss cheese attachment 10 may include a first portion 12. The first portion 12 may define at least one through hole 14 and may comprise at least one grate 16. The at least one grate 16 may be located within the at least one through hole 14.

The first portion may be a part for use in an automobile, aircraft, watercraft, or any vehicle or application where parts including dissimilar materials are utilized. The first portion may be a hard plastic molded via an injection molding process or as a first portion molded in a two-shot injection molding process, or in an over mold injection process. In a number of variations the hardness of the first portion may range from about 100 MPa to about 2500 MPa. The first portion may define at least one through hole within a body of the first portion. The at least one through hole may be formed at the same time that the part is formed. Alternatively, the at least one through hole may be formed as part of secondary or post-processing operations or by any other suitable means known in the art. In a number of variations, suitable materials for the first portion may include, but are not limited to, styrenics, acetal, thermoplastic polyolefin (TPO), thermoplastic polyurethanes (TPU), polycarbonates, acrylics, nylons, polyethylene, polyesters, thermoset composites, poly vinyl chlorides, and/or ionomers.

The at least one through hole may be of any cross-sectional shape or configuration desired. The at least one through hole may range in cross-sectional area from about macroscopic to about microscopic to about nanoscopic in size. In a number of variations, the holes may have a diameter ranging from about $\frac{1}{16}$ inch to 1 inch, or for squares or rectangular holes having dimensions ranging from about $\frac{1}{16}$ inch by $\frac{1}{16}$ inch by $\frac{1}{16}$ inch to about 1 inch by 1 inch by 1 inch, or for hole of other shapes the hole may be of an area ranging from 0.0039 to 1 square inches.

The second portion may be a part for use in an automobile, aircraft, watercraft, or any vehicle or application where parts including dissimilar materials are utilized. The second portion may be a soft polymer molded via an injection molding process. In a number of variations the hardness of the second portion may range from about 15 Shore A to about 95 Shore D. The second portion may extend through the at least one through hole within a body of the first portion. In a number of variations suitable materials for the second portion include, but are not limited to, thermoplastic elastomers (TPE), thermoplastic vulcanite, thermoplastic polyolefin (TPO), polyvinyl chlorines, and/or thermoplastic polyurethanes.

The grate may be constructed and arranged to facilitate the interlocking mechanical bond of the first portion and the second portion by increasing the amount of surface contact between the first portion and the second portion. The grate may define a plurality of openings, and the cross-sectional area of the openings may range from about macroscopic to about microscopic to about nanoscopic in size. In a number of variations the grate may include a plurality of horizontal and vertical bars or rods made from fiber, polymer, or metal such as wire.

According to a first variation, a product may include a first portion that may include a first composition and may be constructed and arranged to define at least one through hole in the first portion. The product may also include a second portion that may include a second composition and may be constructed and arranged to extend through the at least one through hole of the first portion such that the first portion and the second portion may form an interlocking mechanical bond.

A second variation may include a product as set forth in the first variation wherein the cross-sectional area of the at least one through hole may range from about macroscopic to about microscopic to about nanoscopic in size.

A third variation may include a product as set forth in the first or second variations where the first composition of the first portion may be capable of chemically bonding to the second composition of the second portion.

A fourth variation may include a product as set forth in the first through second variations where the composition of the first portion may be incapable of chemically bonding to the composition of the second portion.

A fifth variation may include a product as set forth in the first through fourth variations where the first portion may additionally include at least one grate and where the at least one grate may be disposed within the at least one through hole of the first portion. The grate portion may be constructed and arranged to further facilitate the interlocking mechanical bond of the first portion and the second portion.

A sixth variation may include a product as set forth in the first through fifth variations where the first portion may be a hard polymer and the second portion may be a soft polymer.

A seventh variation may include a product as set forth in the fifth through sixth variations where the at least one grate may include a plurality of through holes and the cross-sectional area of the plurality of through holes may range from about macroscopic to about microscopic to about nanoscopic in size.

An eighth variation may include a method that may include providing a first part and a casting mold. The first part may include a body and be made of a first composition. The body may define at least one through hole within the first part. The first part may be positioned within the mold and a molten material may be flowed into the mold and through the at least one through hole of the first part. The molten material may be made of a second composition; the second composition may differ from the first composition. The molten material may be allowed to cool such that a second part is formed. The second part may form an interlocking mechanical bond with the first part via a portion of the second part extending through the at least one through hole of the first part.

A ninth variation may include a method as set forth in the eighth variation wherein the cross-sectional area of the at least one through hole may range from about macroscopic to about microscopic to about nanoscopic in size.

A tenth variation may include a method as set forth in the eighth through ninth variations where the first composition of the first part may be capable of chemically bonding to the second composition of the second part.

An eleventh variation may include a method as set forth in the eighth through tenth variations where the composition of the first part may be incapable of chemically bonding to the composition of the second part.

A twelfth variation may include a method as set forth in the eighth through eleventh variations where the first part may additionally include at least one grate and where the at least one grate may be disposed within the at least one through hole of the first portion. The grate portion may be constructed and arranged to further facilitate the interlocking mechanical bond of the first portion and the second portion.

A thirteenth variation may include method as set forth in the eighth through twelfth variations where the first part may be a hard polymer and the second part may be a soft polymer.

A fourteenth variation may include a method as set forth in the eighth through thirteenth variations where the at least one grate may include a plurality of through holes and the cross-sectional area of the plurality of through holes may range from about macroscopic to about microscopic to about nanoscopic in size.

A fifteenth variation may include a method that may include providing a mold. The mold may define a cavity. A first molten material may be injection molded within the cavity and allowed to harden, thereby forming a first part. The first part may include a body and be made of a first composition. The body may define at least one through hole within the first part. A second molten material may be injection molded within the cavity and may flow through the at least one through hole of the first part. The second molten material may be made of a second composition and the second composition may differ from the first composition. The second molten material may be allowed to cool such that a second part is formed. The second part may form an interlocking mechanical bond with the first part via a portion of the second part extending through the at least one through hole of the first part.

A sixteenth variation may include a method as set forth in the fifteenth variation wherein the cross-sectional area of the at least one through hole may range from about macroscopic to about microscopic to about nanoscopic in size.

A seventeenth variation may include a method as set forth in the fifteenth through sixteenth variations where the first composition of the first part may be capable of chemically bonding to the second composition of the second part.

An eighteenth variation may include a method as set forth in the fifteenth through seventeenth variations where the composition of the first part may be incapable of chemically bonding to the composition of the second part.

A nineteenth variation may include a method as set forth in the fifteenth through eighteenth variations where the first part may be a hard polymer and the second part may be a soft polymer.

A twentieth variation may include a method as set forth in the fifteenth through nineteenth variations where at least one grate may be provided within the cavity and the first molten material may be allowed to flow over the at least one grate, and where the first molten material may be allowed to harden, thereby encapsulating a portion of the at least one grate and where a portion of the at least one grate remains exposed within the at least one through hole of the first portion. The at least one grate may include a plurality of through holes and the cross-sectional area of the plurality of through holes may range from about macroscopic to about microscopic to about nanoscopic in size.

The above description of variations of the invention is merely demonstrative in nature and, thus, variations thereof are not to be regarded as a departure from the spirit and scope of the inventions disclosed within this document.

What is claimed is:

1. A product comprising:
   a first portion comprising a molded first composition and being constructed and arranged to define at least one through hole, wherein the first part comprises a body and a first chemical composition, the body defining a first surface, a second surface, and at least one through hole between the first surface and the second surface;

a second portion comprising a molded second composition and being constructed and arranged to extend through the through hole of the first portion such that the first portion and the second portion are in an interlocking mechanical bond and so that the second part abuts both the first surface and the second surface, wherein the first portion further comprises at least one grate and where the at least one grate is disposed within the at least one through hole of the first portion; and wherein the grate portion is constructed and arranged to further facilitate the interlocking mechanical bond of the first portion and the second portion.

2. A product as set forth in claim 1:
wherein the cross-sectional area of the at least one through hole ranges from about macroscopic to about nanoscopic in size.

3. A product as set forth in claim 1:
wherein the first composition of the first portion is chemically bonded to the second composition of the second portion.

4. A product as set forth in claim 1:
wherein the composition of the first portion is not chemically bonded to the composition of the second portion.

5. A product as set forth in claim 1:
wherein the first portion comprises one of styrenics, acetal, thermoplastic polyolefin, thermoplastic polyurethanes, polycarbonates, acrylics, nylons, polyethylene, polyesters, thermoset composites, poly vinyl chlorides, and ionomers, and
wherein the second portion comprises one of thermoplastic elastomers, thermoplastic vulcanite, thermoplastic polyolefin, polyvinyl chlorines, and thermoplastic polyurethanes.

6. A product as set forth in claim 1:
wherein the at least one grate comprises a plurality of through holes and the cross-sectional area of the plurality of through holes ranges from about macroscopic to about microscopic to about nanoscopic in size.

7. A product comprising:
a first portion comprising a molded first composition and being constructed and arranged to define at least one through hole, wherein the first part comprises a body and a first chemical composition, the body defining a first surface, a second surface, and at least one through hole between the first surface and the second surface;

a second portion comprising a molded second composition and being constructed and arranged to extend through the through hole of the first portion such that the first portion and the second portion are in an interlocking mechanical bond and so that the second part abuts both the first surface and the second surface, wherein the first portion further comprises at least one grate and where the at least one grate is disposed within the at least one through hole of the first portion, wherein the grate portion is constructed and arranged to further facilitate the interlocking mechanical bond of the first portion and the second portion, and wherein the at least one grate comprises a plurality of through holes and the cross-sectional area of the plurality of through holes ranges from about macroscopic to about microscopic to about nanoscopic in size.

8. A product as set forth in claim 7:
wherein the at least one grate comprises a plurality of horizontal and vertical bars.

9. A product as set forth in claim 7:
wherein the at least one grate comprises one of polymer and metal.

10. A product as set forth in claim 7:
wherein the cross-sectional area of the at least one through hole ranges from about macroscopic to about nanoscopic in size.

11. A product as set forth in claim 7:
wherein the first composition of the first portion is chemically bonded to the second composition of the second portion.

12. A product as set forth in claim 7:
wherein the first portion comprises one of styrenics, acetal, thermoplastic polyolefin, thermoplastic polyurethanes, polycarbonates, acrylics, nylons, polyethylene, polyesters, thermoset composites, poly vinyl chlorides, and ionomers, and
wherein the second portion comprises one of thermoplastic elastomers, thermoplastic vulcanite, thermoplastic polyolefin, polyvinyl chlorines, and thermoplastic polyurethanes.

* * * * *